Aug. 28, 1923.

H. MORRISON

PIPE END FINISHING TOOL

Filed Dec. 15, 1920

Inventor
Hackley Morrison,
By Prentiss, Stone & Boyden,
Attorneys.

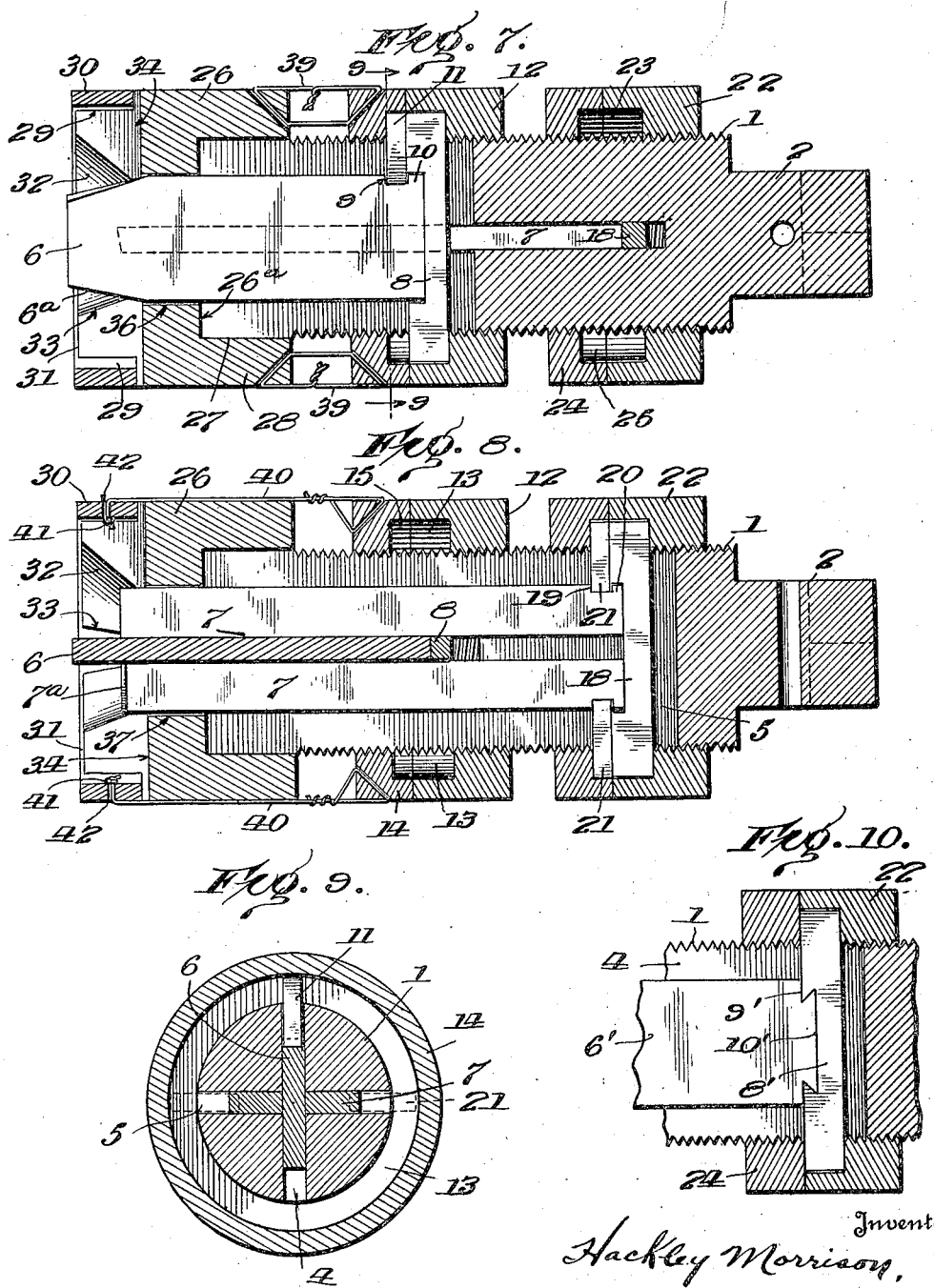

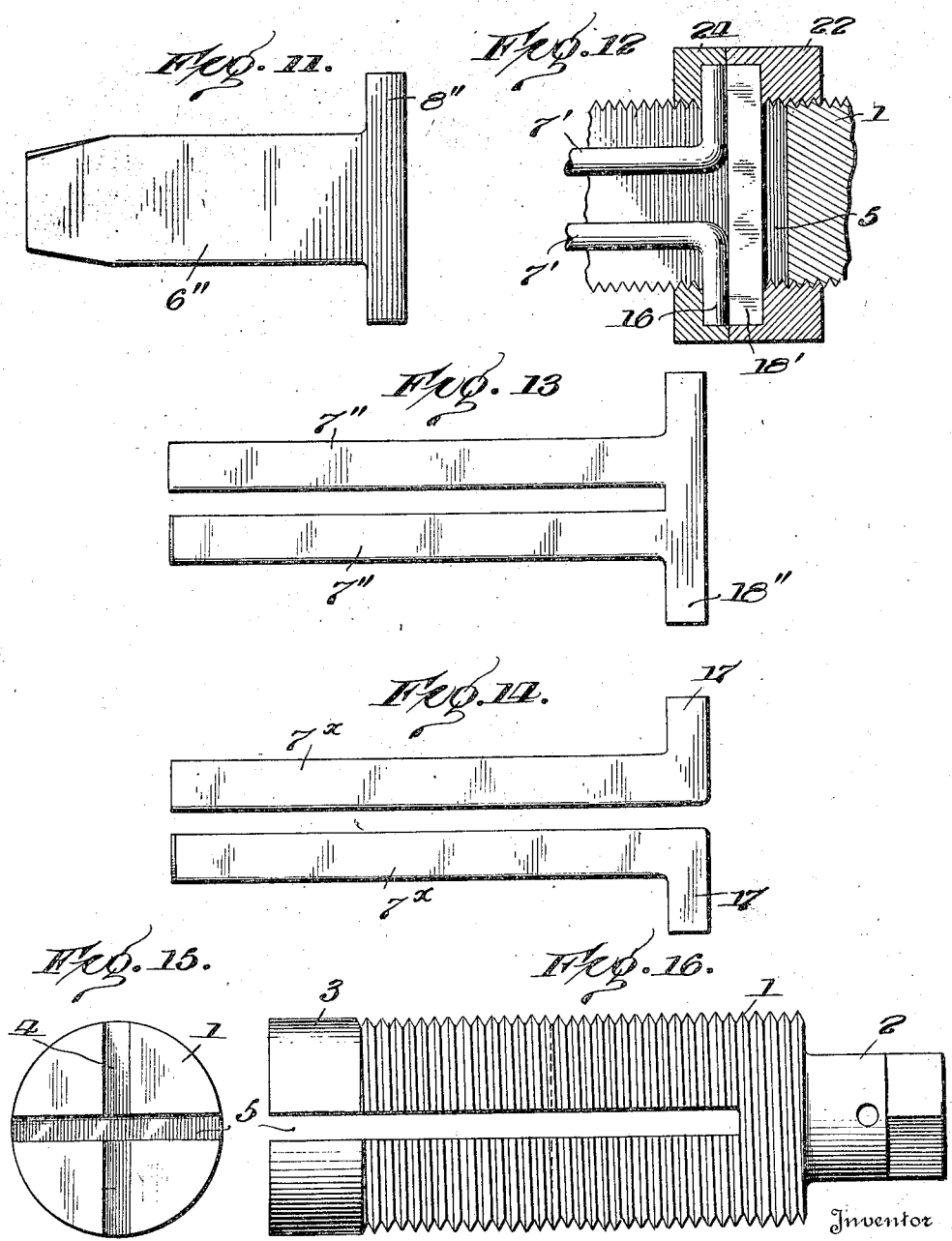

Patented Aug. 28, 1923.

1,466,409

UNITED STATES PATENT OFFICE.

HACKLEY MORRISON, OF RICHMOND, VIRGINIA.

PIPE-END-FINISHING TOOL.

Application filed December 15, 1920. Serial No. 430,866.

*To all whom it may concern:*

Be it known that I, HACKLEY MORRISON, a citizen of the United States, residing at Richmond, in the county of Henrico and State of Virginia, have invented certain new and useful Improvements in Pipe-End-Finishing Tools, of which the following is a specification.

This invention relates to a tool for treating or finishing the burred or ragged ends of metal pipes, and more particularly for treating the ends of the blanks from which wrought iron nipples are made.

Pipes or nipple blanks, when cut off with the usual type of cutter, are burred both inside and outside, and have a more or less irregular edge. Before threading such nipple blanks or pipe ends it is necessary to remove the outer burr and smooth and taper the surface in order that the threading tool may properly take hold. This is known as chamfering. It is also desirable to remove the inner burr from the pipe end so as to provide a free and unrestricted passage for the flow of fluid. This operation is known as reaming. It is, finally, advisable to true up the pipe end to prevent the formation of too sharp an edge, and to cause such edge to lie in a plane at right angles to the axis. This step may be called end-cutting or finishing.

Generally speaking, it is the object of the present invention to provide a tool which will efficiently and accurately perform the work of reaming, chamfering and end finishing at a single operation.

In tools of this type as heretofore proposed, it has been customary to employ radial screws for securing the various cutter blades in position. I have found in practice that it is impossible to prevent such screws from becoming loose, and when the tool is run at high speed, the operator is in constant danger of being injured by these screws being hurled in his face by centrifugal force. A specific and important object of the present invention, therefore, is to provide means for retaining the parts in position without the use of radial screws of any kind.

Another specific object is to so design the parts of the tool that the various cutters can be cheaply manufactured and easily sharpened.

A still further object of the invention is to devise a holder from which some of the cutters can be removed without disturbing others, and to provide means whereby the cutter blades can be adjusted longitudinally of the holder while such holder is in position on the tool spindle which drives it.

Many other objects and advantages of my improved tool will appear in detail from the following specification, and the novel features of construction will be pointed out in the appended claims.

In order that the invention may be readily understood, reference is had to the constructions shown by way of illustration in the accompanying drawings, forming part of this specification, and in which:—

Figures 7 and 8 are longitudinal sections of the tool shown in Figure 1, said sections being taken on planes at right angles to each other;

Figure 9 is a transverse section on the line 9—9 of Figure 7 looking in the direction of the arrow;

Figure 10 is a fragmentary longitudinal section similar to the middle portion of Figure 7, but showing a slightly modified construction;

Figure 11 is a side elevation of a modified form of reamer blade;

Figure 12 is a fragmentary longitudinal section similar to the rear portion of Figure 8, but showing a modified construction of end connecting blades, such construction corresponding with that shown in Figure 4;

Figures 13 and 14 are side elevations showing still further modified arrangements of end connecting blades; and Figures 15 and 16 are end and side elevations, respectively, of the body or holder in and on which the cutters are mounted.

Figure 1:
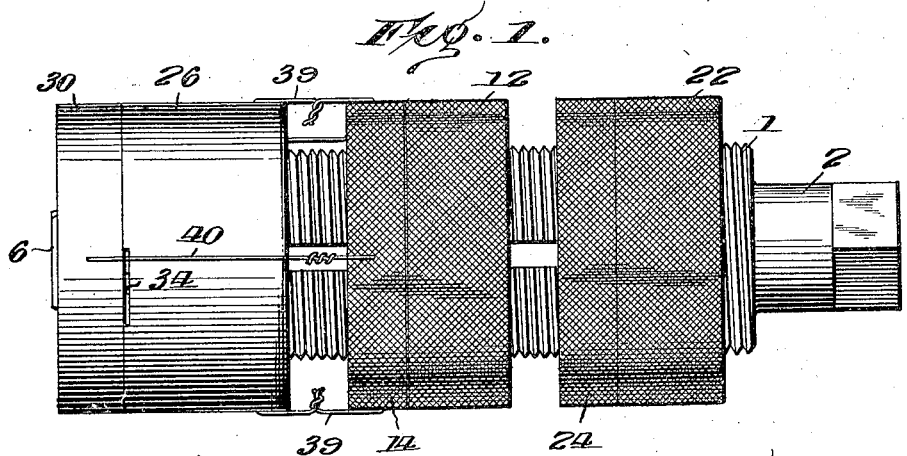
Figure 1 is a side elevation of my improved tool complete, ready to be mounted on a tool spindle.

Although possessing many features of great utility and advantage when employed with any desired kind of a tool chuck or spindle, the present invention is especially intended for use in connection with a machine of the type shown in my copending application Serial Number 366,662, filed March 17, 1920.

Referring to the drawings in detail, the body or holder of my improved tool consists of a cylindrical member 1 exteriorly threaded throughout a greater portion of its length, as most clearly shown in Figure 16, and provided at one end with an integral shank 2 of any desired type for mounting in a suitable tool spindle. At its other end the holder has a smooth or unthreaded portion 3, for a purpose which will hereinafter appear.

Extending transversely through and longitudinally of the body or holder 1 are a pair of intersecting slots 4 and 5. While these slots are shown in Figure 15 as being diametrical, it is obvious that the halves of either slot, on each side of the center, may be slightly displaced from a true diameter if desired, in order that the cutting edges of the blades hereinafter referred to may lie in radial planes.

In the slot 4 is mounted a reamer blade 6 which is in the form of a straight, flat piece of steel with its projecting end somewhat tapered, as shown in Figure 7, to provide converging cutting edges 6$^a$.

In the slot or slots 5 are mounted a pair of end cutting blades 7, each such blade being, as shown in Figures 7, 8 and 9, in the form of a straight, flat piece of steel, with its projecting end slightly bevelled off to form a cutting edge 7$^a$. As shown in Figures 2, 7, 8 and 9, the end cutting blades 7 are illustrated as disposed one on either side of the reamer blade 6 and in engagement therewith. This exact construction is not, however, essential to the invention and other modified arrangements can be employed, as will hereinafter appear.

As will be obvious, the resistance of the work creates a strong backward thrust against these reaming and end cutting blades, and means are provided for effectively supporting such thrust. The novel means which I have devised for doing this comprises, in the case of the reamer blade 6, a transversely extending bar or member 8 which is in engagement with the rear end of the reamer blade, and which is preferably recessed to receive such end. One edge of the reamer blade adjacent its rear end is provided, as shown in Figure 7, with a notch 9 forming a tongue or tenon 10, and in the notch 9 seats one end of a radial key 11.

It will be understood that the radial or transversely extending members 8 and 11 lie within the slot 4 and have their ends projecting beyond the periphery of the body or holder 1. A thrust collar or nut 12 is threaded over the body 1 and forms an abutment against which the ends of the transversely extending member 8 engage, so that the thrust on the reamer blade is amply supported. The collar or nut 12 is preferably recessed, as indicated at 13 in Figure 8, and the transverse member 8 is of such length as to snugly fit within and be enclosed by such recess, the width of said member being approximately equal to the depth of the recess.

It will furthermore be observed that the position of the nut 12 relative to the holder 1 may be accurately adjusted by simply turning the nut. In this way, the reamer blade 6 may be caused to project from the front end of the body to any desired extent.

A lock nut 14 is also threaded over the body 1 in advance of the adjusting nut 12 and this lock nut 14 is also recessed, as indicated at 15 in Figure 8, to receive the projecting end of the key 11. The depth of the recess 15 is preferably substantially equal to the width of the key 11, so that when the parts are assembled as shown in Figure 7, the adjusting nut 12 abuts against the lock nut 14 and is thus held in position. The purpose of the key 11 behind which the tenon 10 engages is to prevent accidental movement or displacement of the blade 6. When it is desired to advance or retract this blade it is of course necessary to turn first the nut 12 and then the nut 14, or vice versa, said nuts always being in engagement when the desired position is reached.

The end cutting blades 7 are held in position and adjusted in a similar manner. As shown in Figure 8, there is provided a second thrust collar or adjusting nut 22 having a recess 23 in which a transversely extending member 18 is enclosed. Similarly each end cutting blade is provided near its end with a notch 19 forming a tenon 20, and in the notches 19 a pair of keys 21 engage, such keys lying within the recess 25 of a second lock nut 24. The method of adjusting the end cutting blades by means of the nuts 22 and 24 is the same as that described in connection with the reamer blade by means of the nuts 12 and 14.

It will be observed that both the reamer and end cutting blades are entirely housed within their respective slots and lie wholly within the cylindrical periphery of the holder 1. The only parts which project beyond such periphery are the ends of the transversely extending members 8, 11, 18 and 21, and these members are wholly enclosed within their recessed respective nuts.

The chamferer which I prefer to employ is of novel form and comprises a cylindrical member 26 bored out at its rear end as indicated at 27 to form a socket capable of snugly fitting over the smooth end 3 of the body or holder 1. Viewed in another way, this chamferer may be considered as comprising a disk, the rear surface 26$^a$ of which is arranged to abut against the forward end of the body or holder 1, which disk is provided with an annular flange 28 surrounding the smooth portion 3 of the holder. In any event, it is important to observe that the abutting surface 26ª is provided for effectively sustaining the end thrust against the chamferer as it is forced against the work. It is obvious that other methods of providing such thrust sustaining abutting surfaces might be readily devised without departing from the spirit of the invention.

Cutting elements 31 are formed integral with and project axially from the front face of the cylindrical or disk-like body of the chamferer, and the outer sides of said elements are cut to a reduced diameter, as indicated at 29 in Figure 7. A guard ring 30 surrounds the cutting elements and is of such thickness and external diameter that its outer surface is substantially flush with the outer surface of the chamferer 26, as shown in Figure 1. This guard ring is for the purpose of presenting a smooth unbroken periphery at the end of the chamferer so as to prevent the cutting elements from snagging the chuck holding the work in case the tool advances too far.

Figure 2:
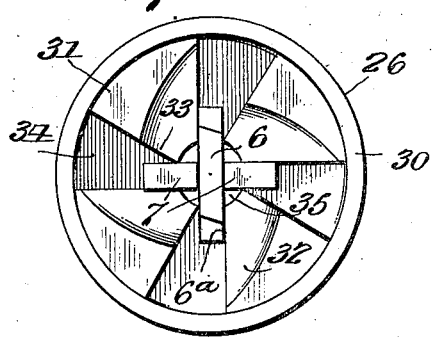
Figure 2 is an end view thereof.

These cutting elements 31 are sector shaped in end elevation, as shown in Figure 2, and their inner portions are cut away to form eccentric conical surfaces 32. The cutting elements may be considered as formed by intersecting grooves 34 milled across the end face of the chamferer. In any event, the sector shaped cutting elements are separated by means of the grooves or spaces 34, and the intersection of one wall of such a groove with the corresponding conical surface, above described, gives rise to the formation of a cutting edge 33. This edge can be readily sharpened by grinding the adjacent flat wall of the groove 34. It will be understood that the cutting elements 31 are so arranged as to form an annular series symmetrically disposed about a common center, with the above described cutting edges extending substantially radially and in an inclined or diverging direction, as shown in Figures 7 and 8. While four of such cutting elements are illustrated in the drawing, it is obvious that a greater or less number may be employed if desired. In the larger sizes it may be preferable to employ six or eight such cutting elements.

Extending through the disk-like portion of the chamferer is a central circular opening 35, as shown in Figure 2, and radiating from this opening and located in the spaces between the cutting elements 31 are a plurality of slots 36 and 37. These slots correspond in size and location exactly with the slots 4 and 5 formed in the holder 1 so that when the chamferer is assembled on the end of such holder, as shown in Figures 7 and 8, the slots 36 and 37 will register with the slots 4 and 5. In this connection it should be remarked that the central opening 35 is by no means essential, and may be omitted if desired. It should also be noted that the slots 36 and 37, as well as the slots 4 and 5, may be cut at any desired angle to each other, an angle of 90 degrees being, however, preferable, as illustrated in the drawings.

It will now be understood that when the chamferer is assembled on the end of the holder, as shown in Figures 7 and 8, the reaming blade and end cutting blades will project through and snugly fit the slots 36 and 37. The result of this is that these blades act as keys for locking the chamferer and body against relative angular displacements and constitute the means by which the chamferer is driven from the holder. In other words, the rotation of the holder is imparted to the chamferer through the instrumentality of the blades 6 and 7.

It is therefore clear that the chamferer may be slipped on and off of the end of the holder without interfering with the reaming and end cutting blades, and it will be equally obvious that these blades can be removed by slipping them out through the slots in the chamferer without disturbing the latter. In order to remove the blades 6 or 7 it is only necessary to turn up the nuts 14 or 24 far enough to uncover the ends of the keys 11 or 21, whereupon these keys may be readily grasped between the fingers and withdrawn, thus releasing the blades and leaving them free to move forwardly. It will be apparent that all of these operations can take place without in any way dismantling the machine or removing the holder from the tool spindle.

As above explained, the chamferer seats solidly against the end of the holder and is thus supported against rearward movement. It is desirable, however, to provide means for preventing the chamferer from slipping forward and off of the holder. This, of course, might be accomplished by means of a set screw, but, as above stated, I regard this method as objectionable. I prefer to fasten the chamferer in position by means other than a screw, preferably by a longitudinally extending anchoring device. As shown in the drawings, this takes the form of a piece of wire 39 which I slip through holes 26ᵇ (see Figure 3) drilled obliquely through the rear edge of the chamfered and through the forward edge of the adjacent lock nut or collar 14. It will be understood that there is no appreciable strain on this wire, any suitable number of which may be employed, and I find in practice that this method of preventing accidental displacement of the chamferer is very satisfactory.

A similar method may be employed for securing the ring 30 in position. To this end the ring is provided with two or more radial openings 42, and anchor wires 40, having a knot 41 formed at their end, are slipped through such holes from the inside, as clearly shown in Figure 8, and their ends engaged through openings in the nut 14 and twisted together.

Instead of using the radial key 11 shown in Figure 7, I may, if desired, secure the reamer blade 6' to the transverse member 8' by means of a dove-tailed mortise and tenon joint as indicated at 9', 10'. This joint alone serves, as will be obvious, to restrain the movement of the blade in both directions, and in this case a plain lock nut 24' may be employed instead of the recessed nut shown in the other figures.

Or, if preferred, the construction shown in Figure 11 may be employed, in which the transversely extending member 8'' is formed integral with the reamer blade 6''.

Figure 3:
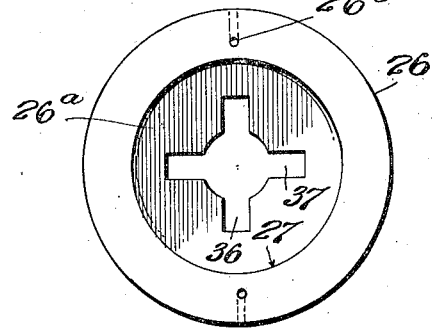
Figure 3 is a rear end view of the chamferer removed.
Figure 5:
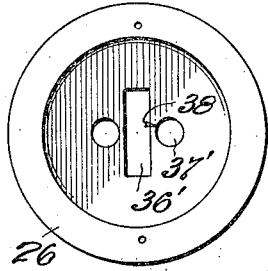
Figure 5 is a rear view of the chamferer shown in Figure 4.

Instead of providing the chamferer with a pair of intersecting slots, as in Figures 2 and 3, I may employ only a single slot 36', as shown in Figure 5, and provide a pair of independent openings 37' for the end cutters, such openings being arranged one on each side of the slot 36' and separated therefrom by an intervening wall 38.

Figure 4:
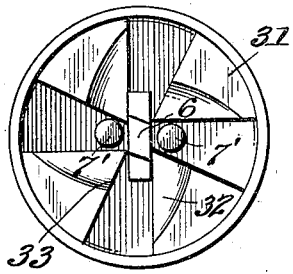
Figure 4 is an end view similar to Figure 2, but on a reduced scale, and showing a slightly modified construction.

As shown in Figures 4 and 5, the openings 37' are round, and to cooperate with this form of chamferer, I provide end cutters in the shape of round rods 7'. While, of course, these rods may be anchored at their rear ends in the manner shown in Figure 8, I prefer to anchor them by bending their ends laterally to form transversely projecting portions 16 which engage the recessed nut 24. In this case, a plain adjusting bar 18' is disposed behind the end cutters 7' to take the thrust.

Figure 6:
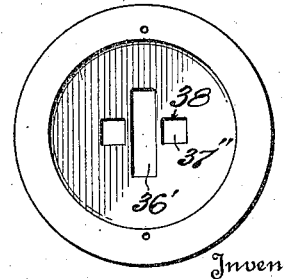
Figure 6 is a similar rear view of a slightly modified chamferer.

While I have shown the openings 37 as round in Figure 5, it is obvious that these openings may be made rectangular, as indicated at 37'' in Figure 6.

In some cases it may be desirable to employ the construction shown in Figure 13, in which the end cutters 7'' are formed integral with the transversely extending member or bar 18''.

Or, as shown in Figure 14, when rectangular end cutting blades 7× are employed, the ends may be turned outwardly, as indicated at 17, in the same manner as shown in connection with the round rods 7' in Figure 12, and such outturned ends may be employed either with or without an additional transverse bar 18, as desired.

It will thus be seen that my improved tool is rugged in construction, cheap in cost of manufacture, and easy to assemble, adjust, and sharpen, and it is thought that the many advantages thereof will be readily appreciated by those familiar with such apparatus without further discussion.

What I claim is:

1. A tool of the type described comprising an elongated body, a plurality of longitudinally extending independently adjustable blades carried by said body, means for independently adjusting said blades, and an additional cutter comprising a plurality of integrally united cutting elements mounted on the end of said body, said cutter being removable as a unit from said body and blades.

2. A tool of the type described comprising an elongated body having a longitudinally extending slot, a blade located in said slot, a removable cap mounted upon and enclosing the end of said body, and a cutter carried by said cap.

3. A tool of the type described comprising an elongated body having a longitudinally extending slot, a reamer blade located in said slot, and a chamfering cutter mounted on the end of said body and having a thrust bearing thereagainst, said cutter having an opening through which said blade extends.

4. A tool of the type described comprising an elongated body having a plurality of longitudinally extending slots, a reamer blade in one of said slots, an end-cutting blade in another of said slots, and a chamfering cutter mounted on the end of said body, and having a thrust bearing against said body.

5. A tool of the type described comprising an elongated body having a plurality of longitudinally extending slots, blades in said slots and having cutting edges at their ends, such ends projecting beyond the end of said body, an additional cutter carried by the end of said body and having cutting edges lying in a common transverse plane with the cutting edges of said blades, means whereby the end thrust against said additional cutter is directly supported by the end of said body, and means for longitudinally adjusting the position of the cutting edges of the blades relative to those of the said additional cutter.

6. A tool of the type described comprising an elongated body having a plurality of longitudinally extending slots, reaming and end-cutting blades in said slots and having their cutting edges projecting beyond the end of said body, a chamfering cutter carried by the end of said body and having cutting edges adjacent those of said blades, said chamfering cutter and body having abutting surfaces whereby the end thrust against the former is supported by the latter, and means for adjusting said blades so as to vary the relation of said several cutting edges to each other.

7. A tool of the character described comprising an elongated body, a circular cutter member removably mounted on the end of said body and having a central polygonal slot, and an independent blade carried by said body and fitting in and extending through the polygonal slot in said cutter member, said blade having cutting edges at its end, adjacent the cutting edges of said cutter member.

8. A tool of the type described comprising an elongated body having a plurality of longitudinally extending slots, a reamer blade in one of said slots, an end cutting blade in another of said slots, and a chamfering cutter mounted on the end of said body, said cutter having openings through which said blades project.

9. A tool of the type described comprising an elongated body having a plurality of longitudinally extending slots, a reamer blade in one of said slots, an end cutting blade in another of said slots, a chamfering cutter mounted on the end of said body, said cutter having openings through which said blades pass, and means for independently adjusting said blades relative to said chamfering cutter.

10. In a tool of the type described, the combination with a cylindrical body or holder having a longitudinal slot, of a cutter member carried by one end of said body and having a slot registering with the first, and a member extending through said slots and locking the parts against relative angular displacement, said member lying wholly within the cylindrical periphery of the body.

11. In a tool of the type described, the combination with a cylindrical body, having a longitudinal slot extending from the end face thereof, of a disc shaped cutter member mounted on the body adjacent such end face, and having an opening registering with said slot, and a blade passing through said opening and slot, and keying the body and cutter member together.

12. In a tool of the type described, the combination with a cylindrical body having a longitudinal slot, of a chamferer removably mounted on and enclosing the end of said body and having a slot registering with the first, and a reaming blade lying in said slots and serving to transmit rotation of the body to said chamferer.

13. In a tool of the type described, the combination with a body or holder, of a chamferer carried thereby and comprising a disk-shaped member having cutting elements projecting axially from one face thereof and spaced apart, said member having an axial polygonal opening extending therethrough between said cutting elements, and means carried by said body engaging in said opening for transmitting the rotation of said body to said chamferer.

14. In a tool of the type described, a chamferer comprising a disk-like member having a series of cutting elements projecting from the face thereof, and spaced apart and having a pair of axial openings extending therethrough in the spaces between said cutting elements, a reamer blade projecting through one of said openings, and an end-cutting blade extending through the other opening.

15. In a tool of the type described, a chamferer comprising a disk-like member having a series of cutting elements projecting from the face thereof, and spaced apart, and having a plurality of axial openings extending therethrough in the spaces between said cutting elements, a reamer blade projecting through one of said openings at the center of said member, and a pair of end-cutting blades projecting through others of said openings and disposed one at each side of said reamer blade.

16. In a tool of the type described, a chamferer comprising a cylindrical member having an annular series of cutting elements projecting from one end thereof, and a guard ring surrounding and enclosing said series of cutting elements so as to form a smooth periphery.

17. In a tool of the type described, a chamferer comprising a cylindrical member having an annular series of cutting elements projecting from one end thereof, and a guard ring surrounding and enclosing said series of cutting elements, the external diameter of said guard ring being approximately the same as that of said cylindrical member, whereby a smooth exterior surface results.

18. In a tool of the type described, the combination with a cylindrical holder having threads on its outer surface, of a plurality of longitudinally extending blades carried thereby, and means for independently adjusting said blades comprising a nut for each blade, said nuts all being threaded on said holder, and spaced apart longitudinally thereof.

19. In a tool of the type described, the combination with a cylindrical holder having threads on its outer surface, of a plurality of longitudinally extending blades carried thereby, and means for independently adjusting said blades comprising a nut for each blade, all of said nuts being threaded on said holder, and one of said blades extending through the adjusting nut for another of said blades.

20. In a tool of the type described, the combination with a cylindrical holder having a threaded outer surface and provided with a plurality of longitudinally extending slots disposed at angles to each other around the axis, of a blade in each slot, all of said blades lying within the periphery of said cylindrical holder, and means for adjusting said blades comprising a nut for each blade, all of said nuts being threaded on said cylindrical holder.

21. In a tool of the type described, the combination with a cylindrical holder having a threaded outer surface and provided with a longitudinally extending slot, of a blade mounted in said slot and lying within the periphery of said cylindrical holder, means for adjusting said blade comprising a nut threaded on said holder, and a member extending from the end of said blade transversely of said holder, with its end projecting beyond the periphery thereof, said projecting end being adapted to be engaged by said nut.

22. In a tool of the type described, the combination with a cylindrical holder having a threaded outer surface and provided with a longitudinally extending slot, of a blade mounted in said slot and lying within the periphery of said cylindrical holder, means for adjusting said blade comprising a nut threaded on said holder, and a member disposed in said slot and transversely of said holder between said blade and nut, whereby axial movement of the latter is transmitted to the former.

23. In a tool of the type described, the combination with a cylindrical holder having a threaded outer surface and provided with a longitudinally extending slot, of a blade mounted in said slot, means for adjusting said blade comprising a recessed nut threaded on said holder, and a member associated with said blade and extending transversely of said holder with its ends received in the recess of said nut.

24. In a tool of the type described, the combination with a cylindrical holder having a threaded outer surface and provided with a longitudinally extending slot, of a blade mounted in said slot, means for adjusting said blade comprising a nut threaded on said holder, and means independent of said nut for preventing displacement of said blade.

25. In a tool of the type described, the combination with a cylindrical holder, of a disk-shaped cutter member bearing against the end of said holder and having an annular flange embracing the same, and fastening means wholly spaced from said holder and engaging said flange to prevent axial displacement of said cutter member.

26. In a tool of the type described, the combination with a cylindrical holder having a screw-threaded portion and a smooth end, a nut surrounding said threaded portion, a cutter member fitting over said smooth end, and a fastening device outside the periphery of said holder connecting said cutter member to said nut to prevent axial displacement thereof.

27. In a tool of the type described, the combination with a cylindrical holder having a screw-threaded portion and a smooth end, a nut surrounding said threaded portion, a cutter member fitting over said smooth end, and a wire passed through openings in said cutter member and nut to tie these parts together against axial movement.

In testimony whereof I affix my signature.

HACKLEY MORRISON.